Feb. 22, 1927.
W. GUIARD
1,618,282

SEAL FASTENING

Filed Feb. 17, 1925

W. Guiard
INVENTOR

By: Marks & Clerk
ATTYS

Patented Feb. 22, 1927.

1,618,282

UNITED STATES PATENT OFFICE.

WILHELM GUIARD, OF VIENNA, AUSTRIA.

SEAL FASTENING.

Application filed February 17, 1925, Serial No. 9,881, and in Austria February 27, 1924.

The invention relates to a seal fastening for letters, documents, packets, bags, boxes, tie-cords and the like which can be made without use of a source of heat, will not crack off from its support, is very durable and practically unbreakable, since it can only be broken by the application of very great force and with the aid of tools.

The invention will be understood from the following description taken in connection with the accompanying drawings in which.

The seal fastening is prepared by cementing a seal disc s—which may be embossed if desired—of celluloid or analogous material on to the support $u$—$u$ and thereby attaching the two tightly together. The celluloid adhesive $k$ is applied as a thin layer by means of a spray, tube or the like, to the support alone, and the seal disc which is of the same colour as ordinary seals and sealing wax, is pressed on to said layer. No signet is required. Asbestos powder may be added to the adhesive, in order to render it viscous. It is also advisable to add carbon tetrachloride, carbon disulphide or some analogous substance in order to accelerate the drying of the adhesive and to lessen the fire risk.

Instead of celluloid, the seal discs may be made of cellon, bakelite, galalith, akalite, or any other substance containing casein or other artificial resin or indeed any other substance of similar character. The adhesive usually consists of a solution of celluloid in acetone with an addition of oxalic acid; but other solvents such as alcohol, wood spirit or the like may be used along with the customary celluloid adhesives.

In the case of thin seal discs of celluloid or the like a backing of presspan or equivalent material can also be used, this being fixed on by means of the adhesive. This makes the seal discs firmer and stronger, and improves the appearance of the seal fastening, since the embossed impression is better protected during the fixing of the seal disc.

Figure 1:
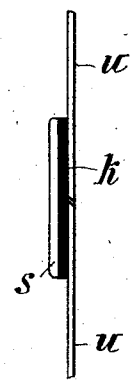
Figure 1 is a side elevation of the preferred form of seal according to the present invention.
Figure 2:
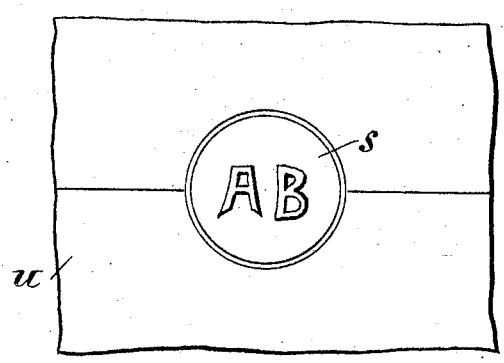
Fig. 2 is a front elevation of the seal shown in Fig. 1.
Figure 3:
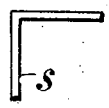
Figs. 3, 4 and 5 show modifications of the form of seal employed.
Figure 4:
Figure 5:
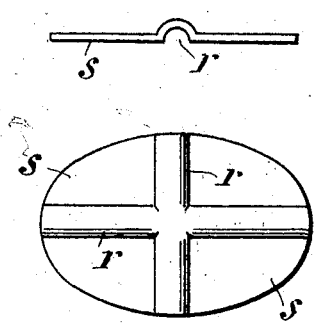

If the fastening is to be affixed on an edge, the seal disc is bent round at an angle before being used as shown in Fig. 3. To secure the closing flaps of packets, etc. or a string fastening, the seal disc is ridged or provided with a groove or two crossed grooves, as shown in Fig. 5, this treatment improving the appearance and enabling a smaller quantity of adhesive to be used.

The seal fastening or a leaden seal according to the invention adheres so firmly to the support that it cannot be detached without injury.

What I claim and desire to secure by Letters Patent is:—

1. A seal fastening comprising a preformed disc from a substance containing celluloid, a support, and a celluloid adhesive for cementing said disc to said support.

2. A seal fastening comprising a preformed disc of celluloid, a support and a celluloid adhesive for cementing said disc to said support.

3. A seal fastening comprising a preformed disc of celluloid, a backing for said disc for strengthening the same, a support and a celluloid adhesive for cementing said disc to said support.

4. A seal fastening comprising a preformed disc of celluloid, a backing for said disc for strengthening the same said backing being cemented to said disc by means of a celluloid adhesive and a support to which said disc and backing are cemented by means of a celluloid adhesive.

5. A seal fastening comprising a preformed celluloid seal disc, a support and means for cementing said seal disc to said support consisting of celluloid adhesive admixed with asbestos powder and carbon tetrachloride.

In testimony whereof I have affixed my signature.

WILHELM GUIARD.